United States Patent [19]

Narimatsu

[11] Patent Number: 4,484,391
[45] Date of Patent: Nov. 27, 1984

[54] MAGNETIC SCALING DEVICE

[75] Inventor: Akihisa Narimatsu, Tokyo, Japan

[73] Assignee: Sony Magnescale Inc., Tokyo, Japan

[21] Appl. No.: 434,575

[22] Filed: Oct. 15, 1982

[30] Foreign Application Priority Data

Oct. 15, 1981 [JP] Japan .................. 56-163476

[51] Int. Cl.³ ............................................. G01B 7/02
[52] U.S. Cl. .................................. 33/125 C; 33/143 L;
 33/172 E; 324/208; 377/24
[58] Field of Search ................... 377/24, 97, 101;
 324/208, 207; 33/125 C, 143 L, 143 M, 147 N,
 148 H, 166, 1 D, 172 E, 1 R

[56] References Cited
U.S. PATENT DOCUMENTS

| 3,332,009 | 7/1967 | Seale | 324/208 |
| 3,582,769 | 6/1971 | Brandenburg | 324/208 |
| 3,777,255 | 12/1973 | Young et al. | 324/207 |
| 4,226,024 | 10/1980 | Westerberg et al. | 33/143 L |

FOREIGN PATENT DOCUMENTS 791902 3/1958 United Kingdom ............ 33/125 C

Primary Examiner—William D. Martin, Jr.
Attorney, Agent, or Firm—Lewis H. Eslinger; Alvin Sinderbrand

[57] ABSTRACT

A magnetic scaling device has a housing formed at least partly of non-magnetic material, such as aluminum or stainless steel. A magnetic scale is disposed on the housing, and a reading head is disposed within the housing and provides an output signal corresponding to relative linear displacement of the reading head and the magnetic scale. In addition, a reference magnetizing body can be disposed on the housing, and a reference magnetic detector can be disposed within the housing to provide a reference signal in response to linear displacement of the detector to a predetermined position corresponding to the position of the reference magnetizing body. At least one of the magnetic scale and the reference magnetizing body is disposed on the exterior of the housing on a non-magnetic portion thereof.

10 Claims, 9 Drawing Figures

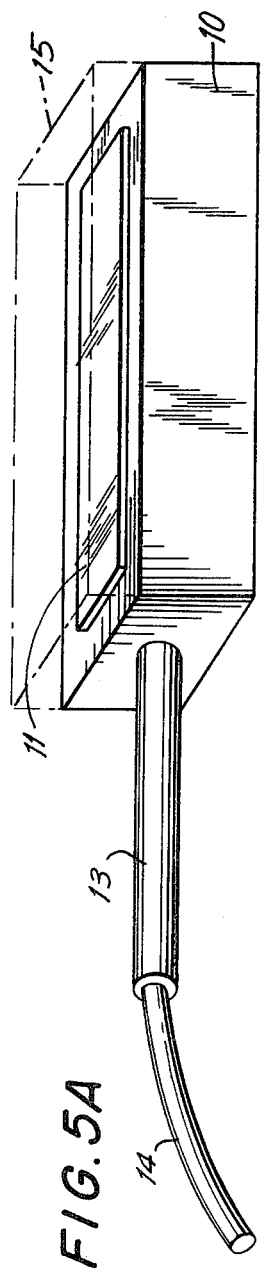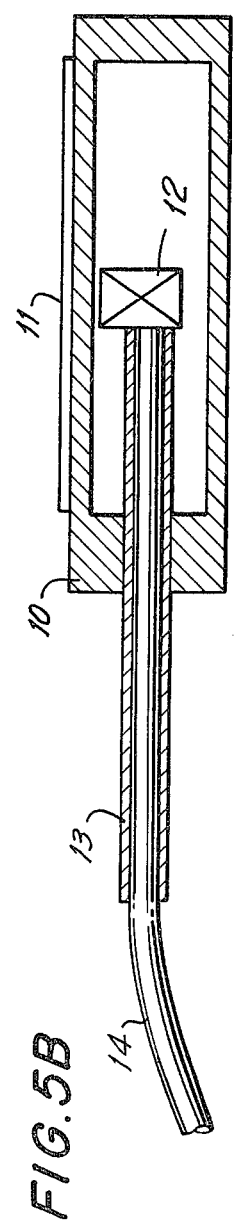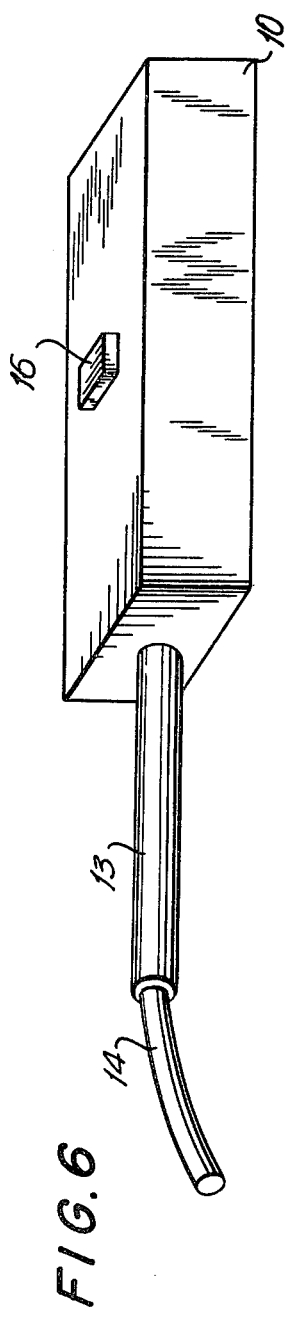

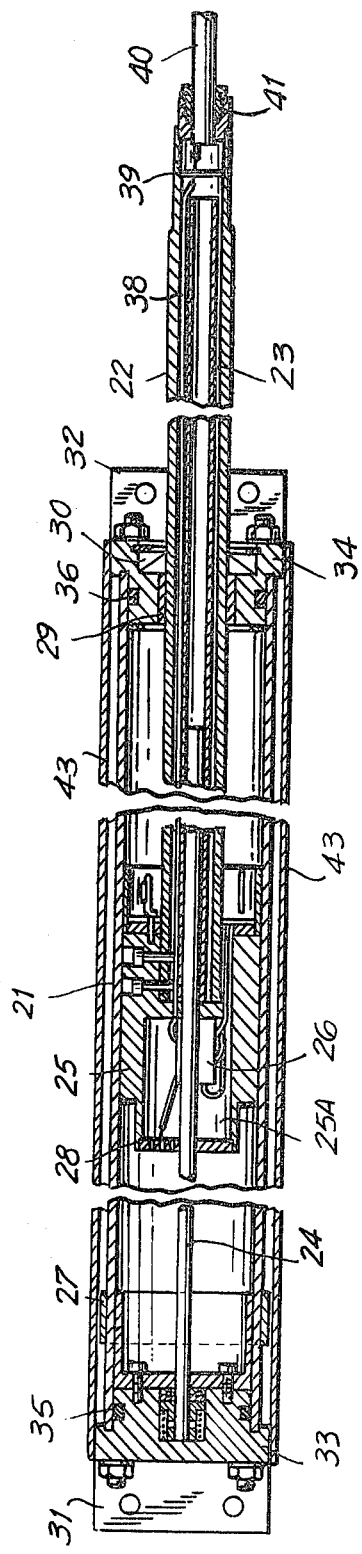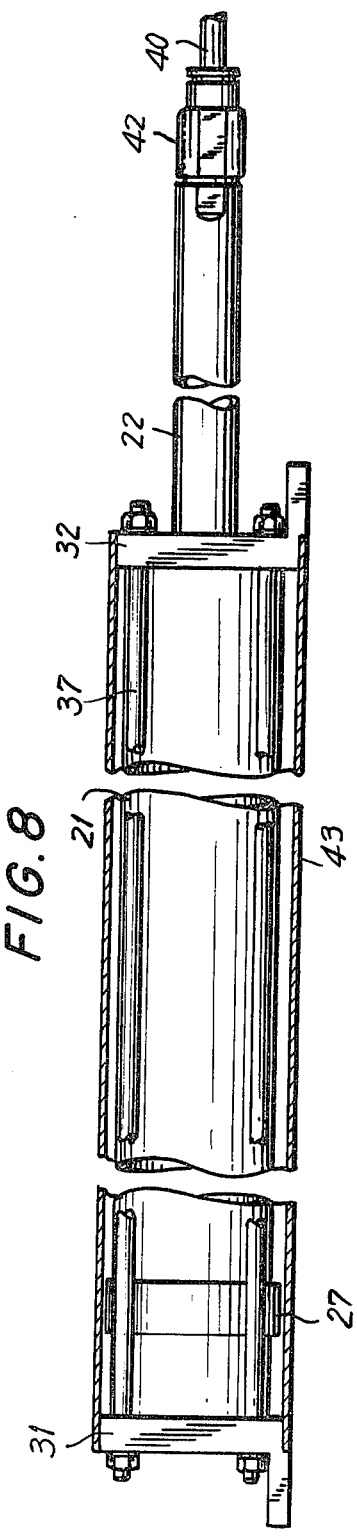

MAGNETIC SCALING DEVICE

BACKGROUND OF THE INVENTION

This invention relates to magnetic scaling devices, and is particularly directed to a magnetic scaling device in which a magnetic reading head provides signals corresponding to indicia recorded on a magnetic scale member to indicate accurately any relative displacement between the magnetic head and the magnetic scaling member. Such a magnetic scaling device finds favorable application, for example, in the control of automatic machine tools or industrial robots.

Magnetic scaling devices are well known. The construction and operation of a typical such device is disclosed in U.S. Pat. No. 3,597,749. Such magnetic scaling devices include a magnetic scale and one or more reading heads arranged so that indicia on the magnetic scale cause the magnetic reading head or heads to generate scale signals when the magnetic scale is moved past the reading heads. These scale signals can be used to derive an accurate indication of the linear displacement between the magnetic scale and the reading head.

Such devices basically employ an incremental measuring procedure. That is, the indicia on the magnetic scale correspond to incremental amounts of displacement. Thus, in order to ensure that the reading heads provide an accurate measurement, each of the indicia must be detected accurately, and no extraneous signals should be generated from the reading heads.

Unfortunately, the magnetic scaling devices are most often employed in an environment containing cutting oil, dust, small particles of magnetic material, or other contaminating elements, owing to the operation of the machine tool in connection with which the magnetic scaling device is used. As a result, the magnetic scale and the reading head can lose their accuracy in a short time unless the magnetic scaling device is adequately protected against these elements.

In order to accomplish this, magnetic scaling devices are often constructed to include a housing or casing having a small opening therein, provided with a dust seal, through which a member extends for moving either the head or the magnetic scale with respect to the housing. The other of the head and magnetic scale is then fixedly disposed on the interior of the housing.

However, even with such construction, the seal provided at the opening is not entirely adequate for protection from contaminants, and, if the magnetic scaling device is used for an extended period of time, water and dust will enter the opening in the casing, and interfere with the accurate operation of the device.

In these magnetic scaling devices, a reference position is determined by use of a reference magnetizing body, normally affixed within the housing, and a reference detecting element, which can be, for example, a Hall element, providing a reference signal when the detecting element is aligned with the reference magnetizing body. In order to ensure that the reference detector is sufficiently protected from cutting oil, metal dust, and other such elements, the reference magnetizing body and the reference detecting element are enclosed within the housing.

Several magnetic scaling devices have been previously proposed in which the magnetic scale, the reading head, the reference magnetizing body, and the reference detecting element are all disposed within a common housing in order to provide adequate protection against the above-mentioned impurities. However, the construction of such devices is usually complicated, and it is difficult, and sometimes impossible, to determine the specific locations of the magnetic scale and of the reference magnetizing body once the device is assembled. However, attempts to simplify the construction of such devices have resulted in devices lacking sufficient protection from these impurities.

OBJECTS AND SUMMARY OF THE INVENTION

Accordingly, it is an object of this invention to provide a magnetic scaling device which can be used in adverse or hostile environments, but which avoids the disadvantages of the prior-art magnetic scaling devices.

More specifically, it is an object of this invention to provide a magnetic scaling device in which adequate protection from dust, cutting oil, particles of magnetic material, and other impurities is provided, but which permits accurate determination of a reference position.

In accordance with the above objects, the present invention provides a magnetic scaling device of the type comprising a casing having an interior and an exterior, a magnetic scale disposed on the casing, a reference magnetizing body disposed on the casing, a reading head disposed in the interior of the casing and providing an output signal corresponding to relative linear displacement of the reading head and the scale, a reference magnetic detector disposed in the casing to provide a reference signal in response to linear displacement of the detector to a position corresponding to the position of the reference magnetizing body, and means effecting relative displacement of the magnetic scale and the reading head and effecting displacement of the reference magnetizing body and the reference magnetic detector. The casing is at least partly made of non-magnetic material, and at least one of the magnetic scale and the reference magnetizing body is disposed on the exterior of the casing on a non-magnetic portion thereof.

A cover can be disposed over the casing to protect the magnetic scale and/or reference magnetizing body from dust, cutting oil, or other elements. The disposition of the magnetic scale and/or the reference magnetizing body on the exterior of the housing permits reference positions of these members to be accurately preset and adjusted in accordance with the operating requirements of any machine tool with which the magnetic scaling device is used.

Many further objects, features, and advantages of this invention will become apparant and will be more fully appreciated from the ensuing detailed description of several preferred embodiments, which is to be considered in connection with the accompanying drawings.

BRIEF DESCRIPTION OF THE DRAWINGS

FIGS. 5A and 5B are perspective and cross sectional views, respectively, of a magnetic scaling device according to an embodiment of this invention.

FIG. 6 is a perspective view of a magnetic scaling device according to another embodiment of this invention.

FIGS. 7 and 8 are a cross sectional and a side elevational views, respectively, of a more detailed embodiment of this invention.

DETAILED DESCRIPTION OF PREFERRED EMBODIMENTS OF THE INVENTION

Initially, for a better understanding of the background of this invention, and to explain its advantages thereover, examples of magnetic scaling devices according to the prior art will be discussed with reference to FIGS. 1-4.

Figure 1:
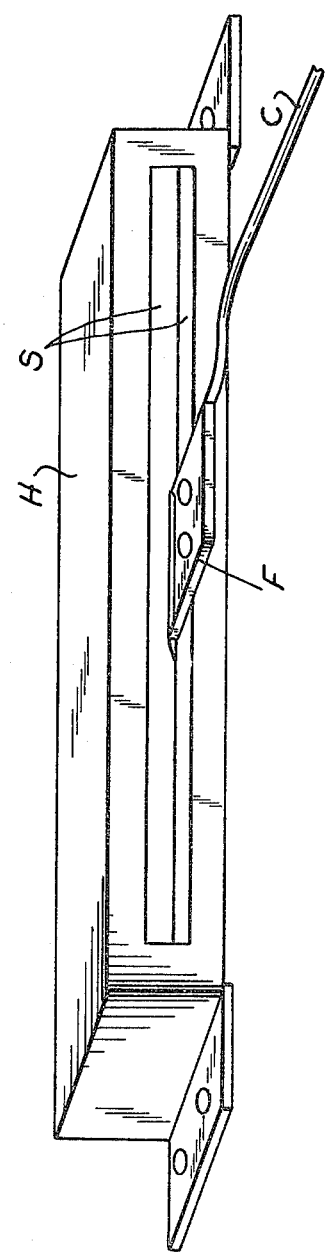
FIG. 1 is a perspective view of a magnetic scaling device according to the prior art.

As shown in FIG. 1, a conventional magnetic scaling device can include a housing or casing H, and a magnetic head holder F. A magnetic scale (not shown) is fixedly disposed within the housing H, and a reading head (not shown) is mounted on the holder F within the housing H. A longitudinal opening is provided in the housing H, and the head holder F extends through this opening to permit relative motion of the reading head and the magnetic scale. A longitudinal seal S is provided on this opening to exclude dust, water, cutting oil, etc., from the interior of the housing H.

However, with the construction of the device of FIG. 1, even with the seal S provided, impurities and particles in the environnment can enter the interior of the casing, and degrade the operability and accuracy of the device.

In order to ameliorate the protection of the head and scale from dust, water, and other impurities, several devices have been previously proposed. These devices have a small axial opening in the housing H, with the opening, the magnetic scale, and the associated reading head disposed in a straight line. Three such devices are shown in FIGS. 2, 3, and 4, respectively.

Figure 2:
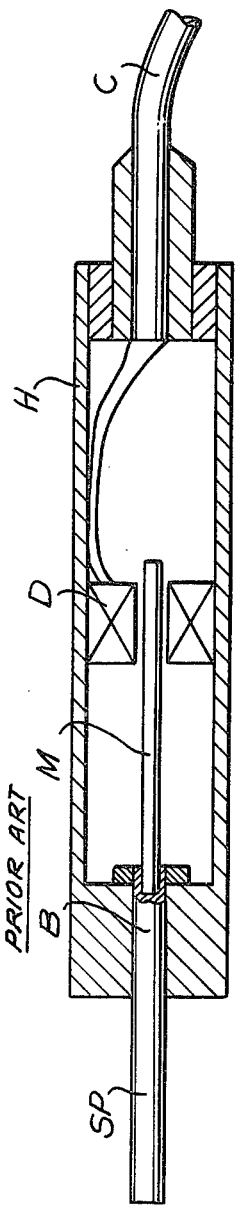
FIG. 2 is a longitudinal cross section of another magnetic scaling device according to the prior art.

In the device of FIG. 2, a casing or housing H is provided with a bearing B on one end thereof and a cable C at the other end thereof. A spindle SP extends through an opening in the bearing B and a magnetic scale M is mounted on the spindle SP. A fixed reading head D is mounted on the interior of the housing H. The opening at the bearing B permits longitudinal movement of the spindle SP and the attached scale M relative to the head D.

Figure 3:
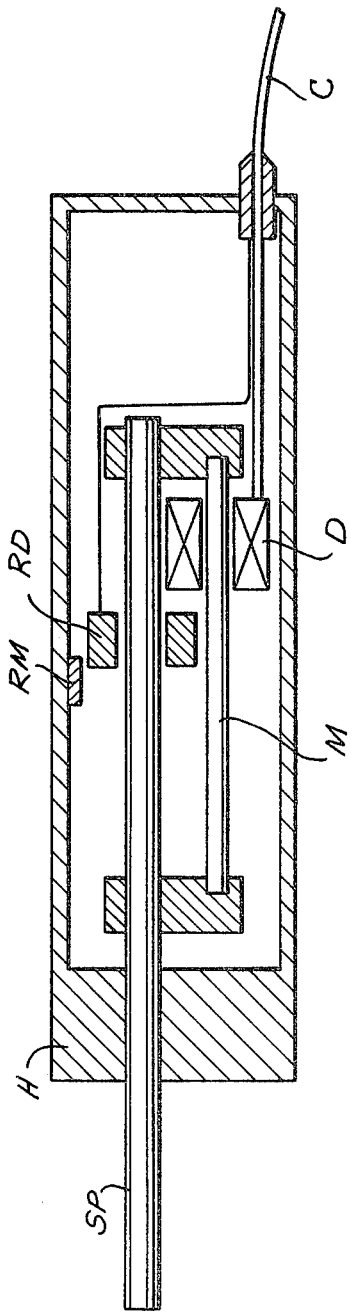
FIGS. 3 and 4 are further longitudinal cross sectional views of magnetic scaling devices according to the prior art.

FIG. 3 shows another device in which the housing H can be shortened somewhat. In this device, the magnetic scale M is mounted in parallel to the spindle SP, rather than coaxially therewith. Also shown in FIG. 3 are a reference permanent magnet RM and a reference detector RD, which can be a Hall detector, a magnetoresistive element, or other equivalent device. The reference detector RD provides a reference signal when the position thereof corresponds to the position of the reference magnet RM mounted on the interior of the housing H.

Figure 4:
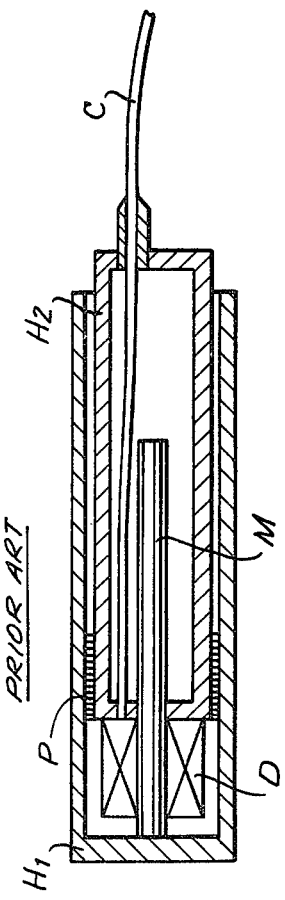

FIG. 4 shows another previously-proposed device in which the casing or housing is further shortened, by construction of the same as a fixed housing portion $H_1$ within which there is situated a movable housing portion $H_2$. A packing or seal P at the juncture of the two portions $H_1$ and $H_2$ excludes oil, dust, particulates, or other contaminants from the interior of the housing $H_1$, $H_2$. In this device, the magnetic scale M is fixedly mounted on the fixed portion $H_1$ of the housing, while the reading head D is attached to the movable portion $H_2$ of the housing.

In each of the above-described devices, because the magnetic scale M and the reading head D are fitted together within a common housing H or $H_1$, $H_2$, together with the reference magnet RM and the reference detector RD, the construction of such devices is rather complex. In addition, the specific location of the magnetic scale M and the reference magnet RM within the housing cannot be adjusted. Furthermore, if provision is made for adjusting the position of the magnetic scale M and the reference magnet RM, the device cannot be provided with adequate protection from contaminants.

A first embodiment of this invention is shown in FIGS. 5A and 5B. In this embodiment, a housing 10 is constructed at least in part of non-magnetic material, such as aluminum, brass, or stainless steel.

A magnetic scale 11 is mounted on the exterior of the housing 11. A reading head 12 for this device is disposed on the interior of the housing 10, and is attached to a holder or spindle 13 extending through an aperture in one end of the housing 10. A cable 14 carries signals from the reading head 12.

As shown in ghost lines in FIG. 5A, a cover 15 can be provided over the magnetic scale 11.

While the housing 10 can be favorably constructed entirely of non-magnetic material, it is necessary only that the side thereof between the magnetic scale 11 and the reading head 12 be of non-magnetic material. This side should be sufficiently thin so that the head 12 can be placed close enough to the scale 11 to pick up magnetic indicia thereon.

The cable 14 extends from the head 12 to the exterior of the device through an axial bore in the spindle or holder 13.

FIG. 6 shows an embodiment of this invention in which a reference magnetizing body 16 is disposed on the exterior of the housing 16. Here, elements shown in FIGS. 5A and 5B are identified with the same reference numerals, and a detailed description thereof is omitted. In this embodiment, the magnetic scale (not shown) can be disposed in the interior of the housing 11 or on a side hidden in this drawing. The spindle 13 and cable 14 connect to the reading head 12 disposed on the interior of the housing 10, and not shown in this drawing. Also, a reference magnetic detecting head (not shown) is disposed inside the housing 10 and is also mechanically connected to the spindle 13. The position of the reference magnetizing body 16 can be adjusted anywhere along the length of the housing 10 as required for operation of a particular machine tool with which the device of this embodiment is associated.

The portion of the housing 10 between the magnetizing body 16 and the associated head should be of an appropriate thickness to permit interaction of the magnetizing body and the head.

Furthermore, a cover corresponding to the cover 15 of FIG. 5A can be disposed over the reference magnetizing body 16 of FIG. 6.

A more specific practical embodiment using the principles of this invention is shown in FIGS. 7 and 8.

In this embodiment, a first, outer cylinder 21 formed of non-magnetic material forms the housing or casing, and a second cylinder 22 and a third, inner cylinder 23 are provided, coaxial with the first cylinder 21, and axially movable with respect thereto.

A rod-type magnetic scale 24 is fixedly disposed with respect to the first cylinder 21 and extends along the axis thereof. A sliding member 25 is affixed by screws on one end of the second cylinder 22 and is dimensioned for a snug, but slideable fit within the interior of the first cylinder 21.

A detecting element 26 for detecting magnetic indicia along the magnetic scale 24 is fixedly disposed within a cavity 25A of the sliding member 25.

A ring magnet 27 is slideably disposed on the exterior of the first cylinder 21, and can be moved arbitrarily to any position along the length of the latter. A detecting element 28 for detecting the magnetic field of the ring magnet 27 is disposed at an end of the sliding element 25. This element 28 can include, for example, a Hall detector.

A bearing 29 and an oil seal 30 journal the second cylinder 22 at one end of the first cylinder 29 to permit sliding of the second cylinder 22 relative to the first cylinder 21, and to exclude oil, dust, and other contaminants from the interior of the first cylinder 21.

Mounting brackets 31 and 32 and end covers 33 and 34 are respectively disposed at the ends of the first cylinder 21. Packings 35 and 36, which can include silicone rubber O-rings, provide sealed fittings of the end covers 33 and 34 to the cylinder 21. The rod-type magnetic scale 24 has one end affixed to the end cover 33, while the bearing 29 and oil seal 30 are disposed in the other end cover 34.

Four tie rods 37 extend through the end covers 33 and 34 to hold the device together.

The detecting elements 26 and 28 have leads 38 extending to a terminal board 39 at a remote end of the second cylinder 22. In this case, the second and third cylinders 22 and 23 define an annulus through which the leads 38 can pass without interference with the relative motion of the scale 24 and the cylinders 22 and 23.

An output signal cable 40 extends from the terminal board 39, and a water-proof seal 41 is provided over this cable 40 at the end of the second cylinder 22. A mounting nut 42 can be provided over this seal 41. This nut 42 secures the second cylinder to a movable part of a tool or device, while the mounting brackets are affixed by screws or the like to a fixed part thereof.

Finally, a magnetic shield cover 43 can be disposed over the first cylinder 21 and the ring magnet 27.

With the device of this invention as described hereinabove, relative displacement of the first, outer cylinder 21, and the second inner cylinder 22 will result in similar relative displacement of the scale 24 and the signal detecting element 26, so that scale signals corresponding to the such relative displacement can be readily derived. A reference signal is provided when the reference detecting element 28 is aligned axially with the ring magnet 27 to detect the presence of magnetic flux lines therefrom passing through the non-magnetic material of the first cylinder 21.

As the position of the ring magnet 27 can be determined arbitrarily, the same can be placed to correspond to any predetermined initial position of an associted machine tool which the magnetic scaling device is to control.

Furthermore, a device embodying this invention can employ a scale of arcuate section disposed on the exterior of the cylinder 21 rather than the rod-type scale 24. In such an embodiment the detecting element 26 can be disposed in proximity to the interior surface of the cylinder 21 to detect indicia on such a magnetic scale.

In other embodiments, the magnetic shield 43 can be omitted.

As is apparent from the foregoing, the structure according to this invention permits the magnetic scaling device to be used in hostile environments, especially where there is an abundance of cutting oil, chips, dust, particles of magnetic material, or other contaminants. Moreover, with the construction according to this invention, the magnetic scale and/or the reference magnetizing body may be located arbitrarily along the length of the device and the position thereof may be easily adjusted.

While several embodiments of this invention have been described in detail hereinabove, it is apparent that many modifications and variations thereof are possible, without departing from the scope and spirit of this invention as defined in the appended claims.

What is claimed is:

1. In a magnetic scaling device of the type comprising a casing having an interior and an exterior; a magnetic scale disposed on said casing; a reading head disposed in the interior of said casing for scanning said magnetic scale and providing an output signal corresponding to relative linear displacement of said head and said scale; and means for effecting relative displacement of said magnetic scale and said reading head; the improvement of said casing being closed and having at least a portion thereof of a non-magnetic material, and said magnetic scale being affixed on the exterior of said non-magnetic portion of the casing such that said reading head scans said magnetic scale through said non-magnetic portion.

2. Magnetic scaling device according to claim 1, further comprising cover means for said magnetic scale disposed outside said casing for magnetically shielding said magnetic scale.

3. In a magnetic scaling device of the type comprising a casing having an interior and an exterior; a magnetic scale disposed on said casing; a reference magnetizing body disposed on said casing; a reading head disposed in the interior of said casing for detecting said magnetic scale and providing an output signal corresponding to relative linear displacement of said reading head and said scale; a reference magnetic detector disposed in said casing to detect said reference magnetizing body and to provide a reference signal in response to linear displacement of said detector to a position corresponding to the position of said reference magnetizing body; means for effecting relative displacement of said magnetic scale and said reading head; and means for effecting relative displacement of said reference magnetizing body and said reference magnetic detector; the improvement of said casing being closed and having at least a portion thereof of a non-magnetic material, and at least one of said magnetic scale and said reference magnetizing body being disposed on the exterior of said non-magnetic portion of said casing, such that one of said magnetic scale or said reference magnetizing body is detected through said non-magnetic portion by one of said reading head and said reference magnetic detector, respectively.

4. Magnetic scaling device according to claim 3, wherein said reference magnetizing body is a permanent magnet diposed on the exterior of said casing and is selectively longitudinally displaceable on said casing.

5. A magnetic scaling device according to claim 3, wherein said casing includes a cylinder of non-magnetic material, and said reference magnetizing body is a ring permanent magnet slidably disposed on said cylinder.

6. Magnetic scaling device comprising a casing including a first cylinder of non-magnetic material, first end plate means closing off one end of said first cylinder, and second end plate means closing off an opposite end of said first cylinder; a second cylinder coaxial with said first cylinder and extending through said second end plate means, the second cylinder being adapted for longitudinal displacement relative to the first cylinder; seal means disposed in said second end plate means to permit sliding displacement of said second cylinder relative thereto; a magnetic scale coaxial with said first and second cylinder, and dimensioned to fit within said second cylinder when the latter is displaced thereover; reading head means responsive to said scale and affixed to said second cylinder and displaceable therewith for providing a signal corresponding to the relative displacement of said scale and said second cylinder; a reference magnetizing body disposed on the exterior of said first cylinder; and reference magnetic transducer means affixed to said second cylinder and displaceable therewith for providing a reference signal when said magnetic transducer means and said reference magnetizing body are aligned.

7. Magnetic scaling device according to claim 6, wherein said magnetic scale is a rod scale.

8. Magnetic scaling device according to claim 6, wherein said reference magnetizing body is a ring magnet disposed to slide in the axial direction on said first cylinder.

9. Magnetic scaling device according to claim 6, further comprising a third cylinder disposed radially intermediate said scale and said second cylinder and coaxial therewith, defining an annular space between said second and third cylinders to accomodate leads from said reading head means and said transducer.

10. Magnetic scaling device according to claim 9, wherein said third cylinder is affixed to said second cylinder.

* * * * *